Aug. 30, 1932.   E. E. EINFELDT   1,874,942
APPARATUS FOR ELECTRIC RIVETING, HEADING, ETC
Filed July 20, 1929   3 Sheets-Sheet 2

INVENTOR
E. E. Einfeldt
BY
ATTORNEYS.

Aug. 30, 1932.   E. E. EINFELDT   1,874,942
APPARATUS FOR ELECTRIC RIVETING, HEADING, ETC
Filed July 20, 1929   3 Sheets-Sheet 3
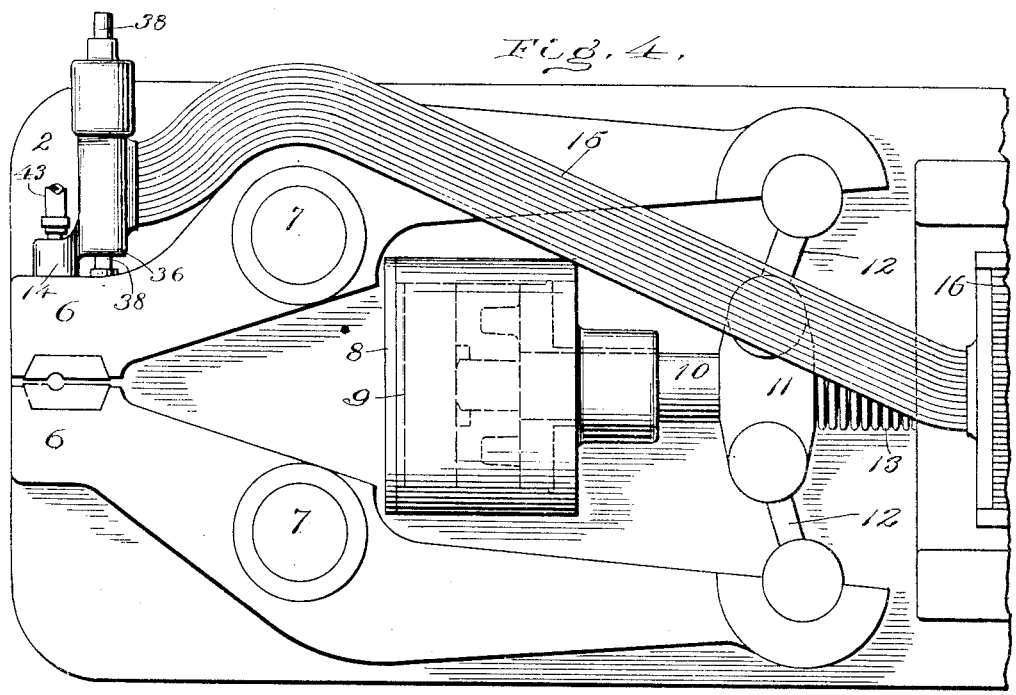
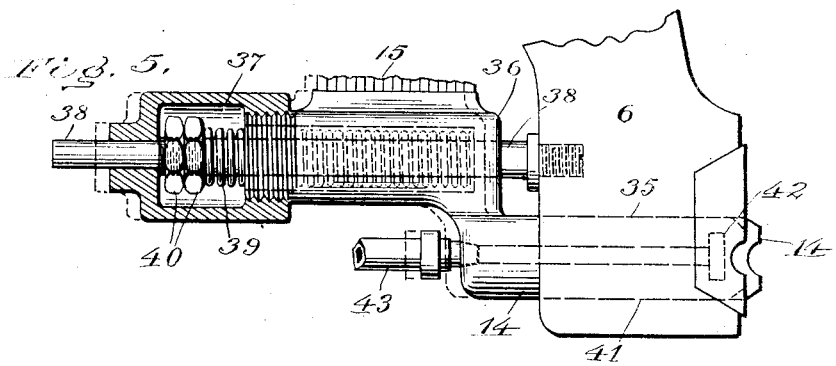
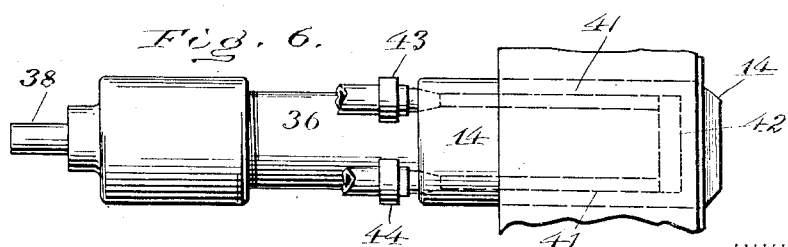
INVENTOR
E. E. Einfeldt
BY
Morrison, Kennedy Campbell
ATTORNEYS.

Patented Aug. 30, 1932

1,874,942

UNITED STATES PATENT OFFICE

ERNEST E. EINFELDT, OF DAVENPORT, IOWA, ASSIGNOR TO FRENCH & HECHT, INCORPORATED, A CORPORATION OF IOWA

APPARATUS FOR ELECTRIC RIVETING, HEADING, ETC.

Application filed July 20, 1929. Serial No. 379,613.

This invention relates to apparatus for use in electric riveting or heading or other operations on electrically heated parts, and has reference more particularly to the heading or riveting of the ends of wheel spokes in order to fasten them to the wheel member, such as the rim or hub, although the invention is applicable for electric riveting or heading or operations for other purposes. In certain types of electric riveting or heading machines, for instance those designed as above referred to for fastening wheel spokes in place in the wheel structure, the spoke is held fixedly between clamping or holding jaws, and the wheel member to which the spoke is to be fastened, for example the wheel rim, is passed over the projecting end of the spoke, the rim being previously formed with a hole to receive the spoke end, and the spoke being previously formed with a shoulder adjacent its outer end against which the rim is seated. Electric connection is made with the side of the spoke usually by means of an electrode supported in relation to the jaws so as to contact with the side of the spoke on the closure of the jaws, and electric connection is also made with the end of the spoke, usually by means of a heating electrode movably supported so that it may be moved into contact with the end of the spoke, the said electrodes being included in a suitable electric heating circuit such as the secondary circuit of an electric transformer. The heating circuit when thus completed through the end portion of the spoke, will heat the same and when a sufficiently high temperature is attained to enable the riveting or heading operation to take place, the heating electrode is disengaged from the end of the spoke and a heading tool is brought into action, which being operated on the heated end of the spoke, will deform the metal and rivet or upset the same down on the rim, thereby forming a head on the end of the spoke which will force the rim tightly against the previously formed shoulder on the spoke and will thereby fasten the parts firmly together.

The present invention is directed to improvements in apparatus of this type designed to insure a perfect electrical contact of the electrode with the side of the spoke, although the face of the electrode may become worn from use, and although irregularities may exist in the shape and size of the clamping jaws, or in the shape and size of the spokes, and the invention consists in an electrode mounted yieldingly relatively to the clamping jaw or member and projecting at its contacting end normally beyond the face of the jaw, whereby on the engagement of the jaw or member with the spoke, the end of the electrode will accommodate itself to irregularities in the jaws or in the spokes and will maintain contact with the side of the spoke without regard to abnormal conditions of the parts mentioned, and a perfect and effective electrical contact of the electrode with the spoke will be obtained.

The invention consists also in the details of construction and combination of parts hereinafter described and claimed.

In the accompanying drawings:

Fig. 4 is a sectional plan view on the line 4—4 of Fig. 1 on an enlarged scale;

Fig. 5 is a fragmentary plan view partly in section of the yielding electrode and the clamping jaw in which it is mounted;

Fig. 6 is a front elevation of the same;

Fig. 7 is a cross-sectional view of the clamping jaws showing the spoke and rim held in place and the heating electrode contacting with the end of the spoke to heat the same; and Fig. 8 is a similar view showing the action of the heading tool in heading down the heated end of the spoke on the rim.

Figure 1:
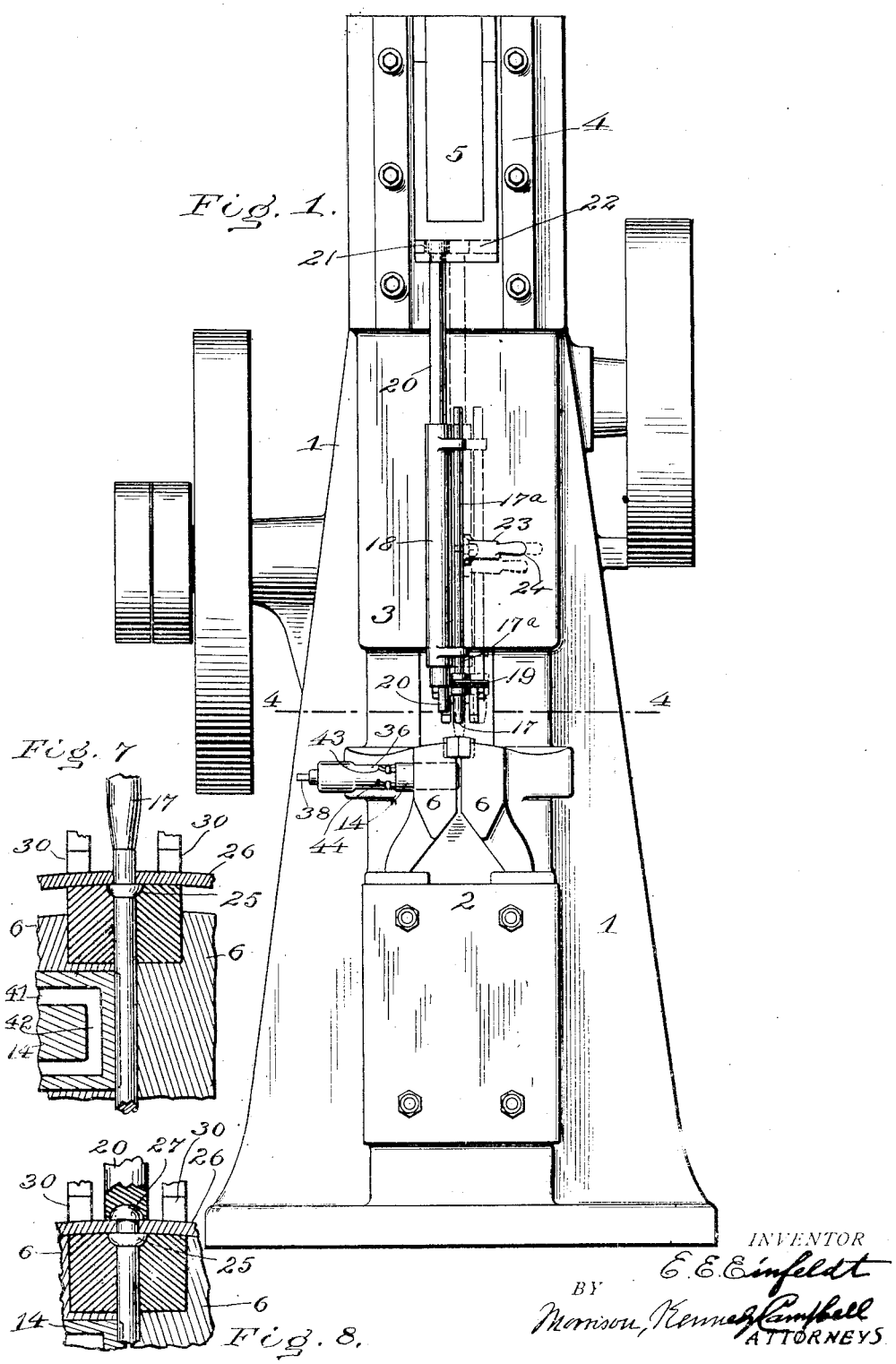
Fig. 1 is a front elevation of a riveting or heading machine having my invention embodied therein.

Referring to the drawings:

The machine illustrated in the drawings which shows by way of example one form of apparatus embodying my invention, comprises an upright frame or column 1 having a lower horizontal portion 2, and an upper horizontal portion 3 overhanging the lower portion and formed with vertical guides 4 in which reciprocates a power driven head or slide 5. Two fore-and-aft extending spoke clamping jaws or members 6—6 are pivotally mounted between their ends on the lower portion of the frame on vertical axes 7 so that the front ends of the jaws may be moved to and from each other to respectively clamp and release the spoke or part to be operated on, said ends of the jaws being formed in their inner faces with opposing vertical grooves in which the spoke is received. Suitable means are provided for operating the jaws, in the present instance by the employment of an air cylinder 8 sustained in a horizontal position on the lower portion of the frame and provided with a piston 9 having fixed to it a rearwardly extending piston rod 10. A head 11 is fixed to the piston rod and has pivoted to it the inner ends of toggle links 12 whose outer ends are pivoted to the rear ends of the jaws. A spring 13 surrounds the free end of the piston rod and bears at its front end against the head 11 and at its rear end against a fixed part of the frame. On the admission of air to the cylinder in front of the piston, the latter will be forced rearwardly against the pressure of the spring and will straighten out the toggle links and spread the rear ends of the jaws apart and thereby close their front ends on the spoke; and when the air is exhausted from the cylinder, the spring in reacting, will move the piston forwardly, thereby folding the toggle links and drawing the rear ends of the jaws together, with the result that the front ends of the jaws will be separated and the spoke released.

Electric connection is made with the side of the clamped spoke by means of a horizontal electrode 14 mounted in one of the clamping jaws in the specific manner presently to be described, which electrode is connected by a flexible electric conductor 15 to the secondary circuit of an electric transformer 16 suitably supported on the frame of the machine. Electric connection is made with the end of the clamped spoke by means of an electrode 17 fixed to the lower end of a carrying stem 17ᵃ mounted to be moved vertically in a guiding frame 18 sustained by the overhanging portion 3 of the machine frame, said electrode being adapted when moved downwardly to contact with the upper end of the clamped spoke, and being connected by a flexible electric conductor 19 with the secondary circuit of the transformer, so that the heating circuit will be completed through the upper end portion of the clamped spoke and will heat the same in a manner well known to those skilled in the art.

The frame 18 is formed with a vertical guideway in which reciprocates a heading tool 20 whose upper end is formed with a head 21 mounted in a horizontal guideway 22 in the lower end of the slide 5, the arrangement being such that the heading tool may be shifted horizontally relatively to the slide while maintaining connection therewith in the vertical reciprocation of the slide. The frame 18 is sustained by the overlying portion of the machine frame in such manner that it may be shifted horizontally relatively to the same in order that the heating electrode and the heading tool may be positioned to act on the spoke to respectively heat and head the same, the frame 18 for this purpose being pivoted in rear of the electrode and heading tool on a vertical axis. The heating electrode is moved up and down in the frame to engage and disengage its end with the end of the spoke by means of an operating lever 23 which is pivoted between its ends to the stem of the electrode and is pivoted at its rear end to the overhanging portion of the machine frame by means of a universal joint, the forward end of the lever being provided with a handle 24 for operating it. By moving the forward end of the lever vertically, the heating electrode will be caused to move up and down relatively to the frame 18 and thereby be engaged with and disengaged from the end of the clamped spoke, and by moving the forward end of the lever horizontally, the frame 18 will be correspondingly moved and the heating electrode may be moved out of line with the spoke and the heading tool brought into line with the same to act on the spoke.

In the use of the apparatus described for fastening spokes to wheel rims, the spoke, provided previously with a shoulder 25 adjacent its outer end to afford a support for the rim, is clamped between the clamping jaws with its upper end projecting some distance above the same, and the rim 26, formed previously with holes to receive the spoke ends, is passed over the projecting end of the spoke and seated against the shoulder on the spoke as shown in Fig. 7. The horizontal electrode 14 will contact at its inner end with the side of the spoke, and electrical contact of the vertical electrode is made with the end of the spoke by lowering the same by the depression of the lever 23 unil the electrode brings up against the end of the spoke. The heating current being thus completed through the outer portion of the spoke, the parts are left in this position until the heat of the spoke attains sufficient temperature to enable the heading operation to take place. When such temperature is attained, the lever 23 is moved to the right, Fig. 1, thereby swinging the frame 18 horizontally and moving the heating electrode out of alignment with the spoke and bringing the heading tool into alignment with the same. The machine is then operated to cause the heading tool to reciprocate vertically and at the same time to rotate on its vertical axis, which operations are effected by mechanism well known in machines of this general type and not necessary here to illustrate. By the operation of the heading tool, the outer heated end of the spoke will be upset in the form of a head 27, see Fig. 8, which will be forced down against the outer side of the rim and the latter will be forced down against the shoulder on the spoke and the parts will be firmly riveted together.

Figure 2:
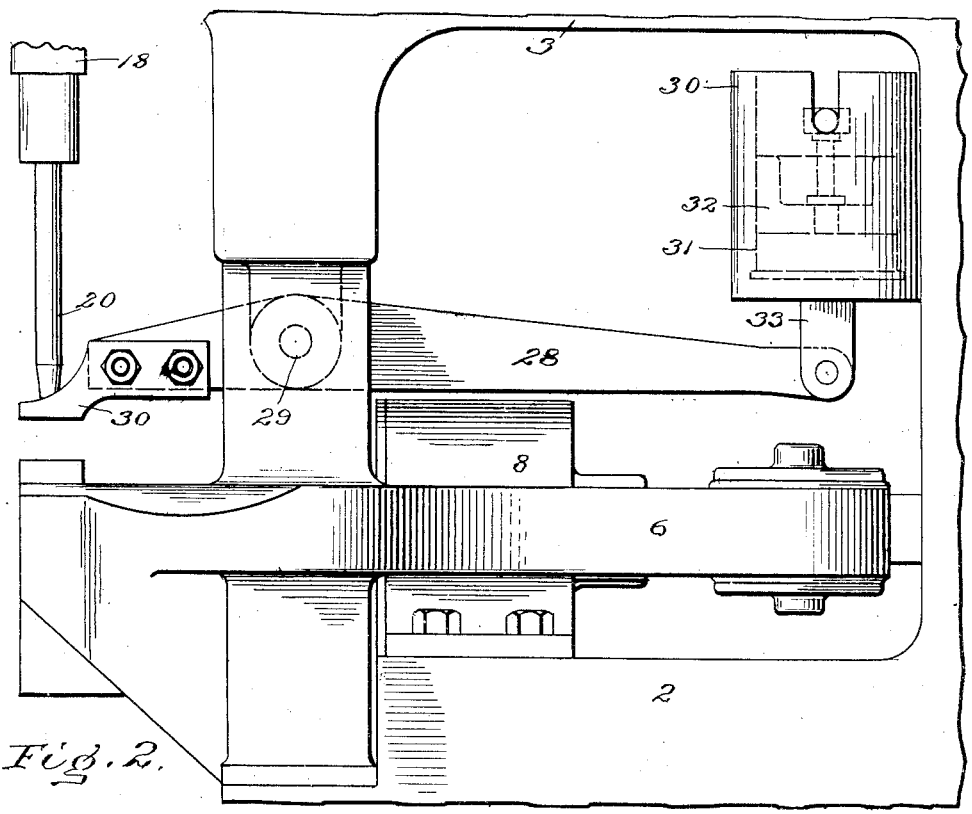
Fig. 2 is a side elevation on an enlarged scale of the spoke clamping jaws and adjacent parts.
Figure 3:
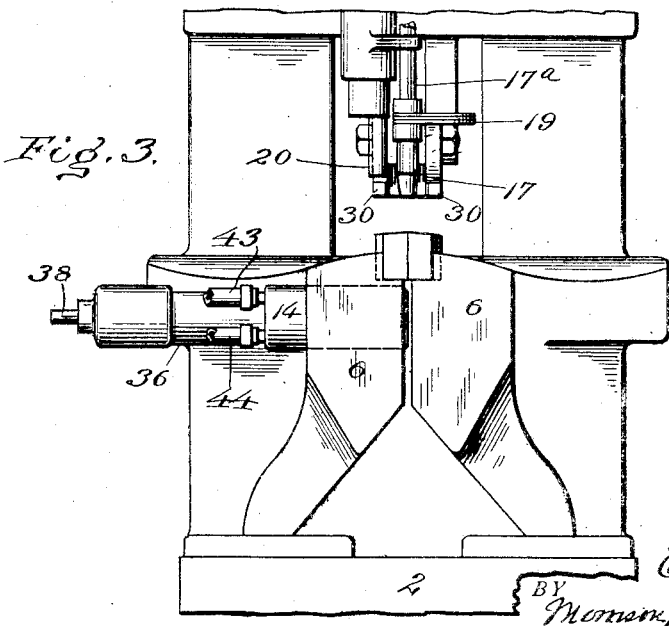
Fig. 3 is a front elevation of the same.

It is desirable in such operation of the heading tool, to hold the rim down against the shoulder on the spoke so that the rim will be prevented from springing up and thereby interfering with the proper heading operation, and in the present instance this is effected by means of a horizontal clamping lever 28, see Fig. 2, which is pivoted between its ends on a horizontal axis 29 to the overhanging portion of the machine frame, and has its forward end forked to form spaced clamping fingers 30, which when lowered on the rim will extend on opposite sides of the end of the spoke and force the rim down on the shoulder on the spoke. In the present instance this lever is operated by means of a vertical air cylinder 31 fixed to the machine frame and provided with a piston 32 having connected with it a piston rod 33, which is pivoted to the rear end of the lever. On the admission of air to the cylinder on the underside of the piston, the latter will be forced upwardly in the cylinder and the rear end of the lever raised, thereby moving the clamping fingers down on the rim; and on the exhaust of the air from the cylinder, the piston will be lowered by a suitable returning spring not shown, and the clamping fingers will be raised and will thereby release the rim.

The present invention is concerned with the form and mounting of the horizontal electrode 14 in the spoke clamping jaw as best shown in Fig. 5. Here it will be seen that the electrode is mounted to slide in a horizontal guiding opening 35 extending through the jaw, and is connected at its outer end with a carrying frame 36 formed with an internal chamber 37 opening through the ends of the frame by means of reduced guiding openings, the conductor 15 before alluded to being connected with the side of the frame 36 as shown. A horizontal rod 38 is fixed at its inner end to the jaw and extends through said guiding openings and chamber so as to give sliding support to the frame, and a spring 39 surrounds the rod within the chamber and bears at its outer end against nuts 40 screwed on the rod near the outer end of the chamber, and at its inner end against the inner wall of the chamber. The spring thus acts to urge the frame and consequently the electrode proper yieldingly inwardly and to maintain the inner end of the electrode projecting a short distance beyond the face of the jaw, so that when the jaw is closed on the spoke, the electrode will engage the side of the same and will be moved back in its guideway against the tension of the spring and will thereby maintain constant contact with the spoke. This yielding action of the electrode is of advantage and importance in that the electrode will accommodate itself to the jaw and spokes notwithstanding such irregularities as may exist in the shape and size of the jaws or the shape and size of the spokes, or other abnormal conditions of the cooperating parts such as wear on the contacting end of the electrode, the result being that a perfect electrical contact between the electrode and side of the spoke will be obtained without regard to the abnormal conditions mentioned.

It will be understood that the electrode 17 will be suitably insulated from its carrying stem 17ª, and that the electrode 14 and its carrying frame will be properly insulated from the jaw sustaining the same.

In order that the overheating of the electrode 14 will be prevented, it is formed with internal side passages 41 entering the electrode proper from the outer end thereof, and with a cross connecting passage 42 near the inner end of the electrode, through which passage a cooling medium may be circulated, the said medium entering one of the passages through a flexible pipe 43 connected with the outer end of the passage, and leaving the other passage by a similar pipe 44 connected to said passage.

In the foregoing description and accompanying drawings I have set forth my invention in the particular detailed form which I prefer to adopt, but it will be understood that the invention is not limited to the construction and details shown which may be variously modified without departing from the spirit of the invention; and further it will be understood that the invention is not limited to any particular form or construction of the parts except in so far as such limitations are specified in the claims.

Having thus described my invention, what I claim is:—

1. In an electrical machine of the type described, the combination of a member movable into engagement with the part to be operated on and formed with a guiding opening therethrough, an electrode guided in said opening, a carrying frame connected with said electrode and movably sustained by said member, a spring acting on the frame to yieldingly sustain the electrode with its end projecting beyond the face of the member, so as to act on said part when the member is engaged with the latter, said electrode being included in an electric heating circuit adapted to be completed through said part.

2. In an electrical machine of the type described, the combination of a member movable into engagement with the part to be operated on, an electrode movable relatively to said member and adapted to make electrical contact with said part when engaged by said member, a guide fixed to said member, a frame movable on said guide and connected with the electrode, a spring sustained by the guide and acting on the frame to yieldingly sustain the electrode with its end projecting beyond the face of the member so as to contact with the part to be operated on when engaged by said member, and an electric heating circuit including said member and adapted to be completed through the part acted on.

In testimony whereof, this specification has been duly signed by:

ERNEST E. EINFELDT.